United States Patent [19]

Sherwood et al.

[11] Patent Number: 4,707,331

[45] Date of Patent: Nov. 17, 1987

[54] TOP END SUPPORT FOR WATER DISPLACEMENT ROD GUIDES OF PRESSURIZED WATER REACTOR

[75] Inventors: Donald G. Sherwood, Monroeville Boro; James E. Gillett, Hempfield Township, Westmoreland County; Douglas E. Ekeroth, Plum Borough, all of Pa.

[73] Assignee: Westinghouse Electric Corp., Pittsburgh, Pa.

[21] Appl. No.: 798,194

[22] Filed: Nov. 14, 1985

[51] Int. Cl.$^4$ .................................. G21C 1/01
[52] U.S. Cl. ............................ 376/463; 376/353; 376/399
[58] Field of Search ............... 376/353, 352, 377, 399, 376/449, 235, 461, 463

[56] References Cited

U.S. PATENT DOCUMENTS

| | | | |
|---|---|---|---|
| 3,212,979 | 10/1965 | Silverblatt . | |
| 3,481,832 | 12/1969 | Rickert | 376/399 X |
| 3,816,245 | 6/1974 | Bevilacqua | 376/353 X |
| 3,915,793 | 10/1975 | Andersson et al. | 376/353 X |
| 3,940,311 | 2/1976 | Frisch et al. . | |
| 4,416,848 | 11/1983 | Feutrel | 376/353 X |
| 4,563,328 | 1/1986 | Steinke | 376/353 X |
| 4,584,168 | 4/1986 | Formanek | 376/353 |

FOREIGN PATENT DOCUMENTS

| | | | |
|---|---|---|---|
| 98774 | 1/1984 | European Pat. Off. | 376/353 |
| 2168564 | 8/1973 | France . | |
| 2326763 | 4/1977 | France . | |
| 2411469 | 7/1979 | France . | |

OTHER PUBLICATIONS

Translation of French Patent Application Nos. 2 326 763, 2 411 469.

Primary Examiner—John F. Terapane
Assistant Examiner—John S. Maples
Attorney, Agent, or Firm—Daniel C. Abeles

[57] ABSTRACT

A top end support for rod guides disposed in closely spaced, parallel axial relationship within an inner barrel assembly of a pressurized water reactor vessel includes, in telescoping relationship, a generally cylindrical support having an end closure with a central aperture therein for receiving a downwardly depending extension from a lower calandria plate and a sleeve having an outer periphery corresponding in cross-section to that of said rod guide and affixed thereto at its lower end, the sleeve having an interior, generally cylindrical surface for receiving the cylindrical support in close engagement therein. The telescopingly engaged, generally cylindrical surfaces of the cylindrical support and the sleeve provide substantial area to function as a long-life wear couple. Both the end closure and the cylindrical sidewalls of the fixed cylindrical support and the interior surface of the sleeve are configured so as to correspond to the perimeter of flow holes disposed in a symmetrical array about the associated depending extension, to permit unimpeded passage therethrough of the core outlet flow.

10 Claims, 5 Drawing Figures

TOP END SUPPORT FOR WATER DISPLACEMENT ROD GUIDES OF PRESSURIZED WATER REACTOR

BACKGROUND OF THE INVENTION

1. Field of the Invention

This invention relates to pressurized water reactors and, more particularly, to a top end support for the water displacement rod guides positioned within the inner barrel assembly of a pressurized water reactor.

2. State of the Prior Art

Certain advanced designs of nuclear reactors incorporate at successively higher, axially aligned elevations within the reactor vessel, a lower barrel assembly, an inner barrel assembly, and a calandria, each of generally cylindrical configuration, and an upper closure dome. The lower barrel assembly may be conventional, having mounted therein, in parallel axial relationship, a plurality of fuel rod assemblies which are supported at the lower and upper ends thereof, respectively, by corresponding lower and upper core plates. Within the inner barrel assembly there is provided a large number of rod guides disposed in closely spaced relationship, in an array extending substantially throughout the cross-sectional area of the inner barrel assembly. The rod guides are of first and second types, respectively housing therewithin reactor control rod clusters (RCC) and water displacer rodlet clusters (WDRC); these clusters, as received within their respectively associated guides, generally are aligned with the fuel rod assemblies.

The calandria includes a lower calandria plate and an upper calandria plate. The rod guides are secured in position at the lower and upper ends thereof, respectively, to the upper core plate and the lower calandria plate. The inner barrel assembly thus is defined in axial height between a first plate of a lower elevation comprising the upper core plate and a second plate of a higher elevation comprising the lower calandria plate. Within the calandria and extending between the lower and upper plates thereof is mounted a plurality of calandria tubes in parallel axial relationship and respectively aligned with the rod guides. A number of flow holes are provided in remaining portions of the calandria plates, intermediate the calandria tubes, through which passes the the reactor core outlet flow as it exits from its passage through the inner barrel assembly.

In similar parallel axial and aligned relationship, the calandria tubes are joined to corresponding flow shrouds which extend to a predetermined elevation within the dome, and which in turn are connected to corresponding head extensions which pass through the structural wall of the dome and carry, on their free ends at the exterior of and vertically above the dome, corresponding adjustment mechanisms. The adjustment mechanisms have corresponding control lines which extend through the respective head extensions, flow shrouds, and calandria tubes and are connected to the respectively associated clusters of RCC rods and WDRC rods, and serve to adjust their elevational positions within the inner barrel assembly and, particularly, the level to which same are lowered into the lower barrel assembly and thus into association with the fuel rod assemblies therein, thereby to control the activity within the core.

A critical design criterion of such reactors is to minimize wear of the rodlets in the rod guides, and thus to reduce or eliminate the factors which produce wear, such as flow induced vibration. Because of the relatively dense packing of the rod guides within the inner barrel assembly, it is critical to maintain substantially uniform distribution of the outlet flow from the reactor core, and an axial direction of that flow through the upper barrel assembly. Even if a uniform, axial flow of the core outlet is achieved, the effects of differential pressure and temperature across the array of rod guides or an individual rod guide can produce significant reaction loads at the support points, or support connections, for the rod guides. These reaction loads, coupled with the flow induced vibration, create a high potential for wear at the support points for the rod guides as well as the rodlets. Additionally, the provision of the calandria, and particularly the lower plate thereof, presents an interface with the top end of the rod guides which does not exist in conventional pressurized water reactors. That interface must be capable of accommodating differential thermal expansions between the lower calandria plate and the inner barrel in order to prevent large thermal stresses from developing. Furthermore, the lower calandria plate and the upper core plate are essentially structurally independent; therefore, vibration of the internals can result in significant relative movement between the supporting connections of the rod guides at their lower and upper ends to the respective upper core plate and the bottom calandria plate. The wear potential under these circumstances is great.

Thus, split, or two-pin connections of conventional types are inappropriate for use as the supporting connections for the top ends of the rod guides since they have too much torsional stiffness. If used, they would wear rapidly, with the result that the top ends of the rod guides would become loose. Rod guides having such loose top end connections are unacceptable because of the rapid rate of wear of the rodlets which would result. Other known mounting devices as well are inappropriate. For example, leaf springs cannot be used to support all of the rod guides because sufficient space is not available within the inner barrel assembly to provide leaf springs of the proper size for the large number of rod guides which are present, even if high strength material is used for the leaf springs.

Beyond the unsuitability of existing, known structural support arrangements, further factors must be taken into account in the consideration of possible designs for the support of the top end of the rod guides within the inner barrel assembly. For example, both the RCC and the WDRC rod clusters should be removable without requiring that the guides be disassembled. This requirement imposes a severe space limitation in view of the dense packing of the guides and their associated rod clusters within the inner barrel assembly. For example, in one such reactor design, over 2,800 rods are mounted in 185 clusters, the latter being received within a corresponding 185 guides. The space limitation is further compounded by the requirement that unimpeded flow holes must be provided in the calandria plates for the core outlet flow. While these foregoing factors severly restrict the available space envelope in the horizontal cross-sectional dimension of the inner barrel assembly, axial or vertical limitations on this space envelope must also be considered. For example, the presence of the support members should not require any increase in the height of the vessel. From a maintenance standpoint, the support members should be replaceable without undue effort. Additionally, the assembly of the calandria must be accomplished without access to the support region.

While the supports for the rod guides must therefore satisfy a wide range of structural and functional requirements relating to, or imposed by, the inner barrel assembly itself, a further critical requirement is that the wear potential of the support structure itself must be minimized. This is a critical requirement in view of the potential for intense vibration arising out of the core outlet flow and the development of contact forces due to differential pressure and steady state and transient temperature conditions across the array of rod guides and the individual rod guides.

Conventional reactor designs do not present the support problems attendant the dense packing of rod guides and associated rod clusters in advanced reactor designs of the type herein contemplated. Thus, there is no known solution to the problems of adequately supporting the rod guides, consistent with the requirements and taking into account the environmental factors which exist in operation of such reactors as hereinabove set forth.

SUMMARY OF THE INVENTION

A pressurized water nuclear reactor, of the type with which the top end supports for water displacement rod guides of the present invention are intended for use, as before noted employs a large number of reactor control rods, or rodlets, typically arranged in what are termed reactor control rod clusters (RCC) and, additionally, a large number of water displacer rods, or rodlets, similarly arranged in water displacer rod clusters (WDRC). For example, in one such reactor, an array of 185 such clusters containing a total of 2800 rodlets (i.e., the total of reactor control rods and water displacer rods) are mounted in parallel axial relationship within the inner barrel assembly. Each of these clusters, moreover, is received within a corresponding rod guide structure. In operation, it is desired to maintain the core outlet flow in an axial flow condition and in a substantially uniform distribution throughout the cross-sectional area of the inner barrel assembly, as it passes through the inner barrel assembly, and thus to prevent cross-flow conditions (i.e., core flow in a direction transverse of the rod guides). This is a critical requirement in reactors of such advanced designs in which the inner barrel is densely loaded with rodlets, as before noted.

The geometry of the reactor vessel itself introduces a structural anomaly which is contrary to maintaining the desired, substantially uniform axial flow condition. Particularly, the circular configuration of the reactor vessel, including the inner barrel assembly, is geometrically incompatible with the generally rectangular or square cross-sectional configuration of the individual rod guides, and correspondingly of an array thereof as stacked in closely adjacent relationship within the inner barrel assembly. Thus, in the peripheral regions between the inside diameter of the cylindrical inner barrel assembly and the outer periphery of the array of rod guides, no rodlets are present, resulting in a non-uniform flow distribution and presenting at least the potential of turbulence and cross-flow conditions with attendant problems of vibration. A related application of a common one of the co-inventors herein, entitled "Modular Former For Inner Barrel Assembly Of Presurized Water Reactor," Gillett et al., Ser. No. 798,195, filed Nov. 14, 1985, and assigned to the common assignee hereof, discloses an invention relating to modular formers which are configured to be mounted in these peripheral regions, to provide hydraulic resistance and thereby to maintain a primarily axial direction, and substantially uniform distribution, of the core outlet flow, throughout the length of the rod guides within the inner barrel assembly.

Thus while the state of the art, in the design of the inner barrel assembly of such advanced types of pressurized water reactors, has addressed the problem of attempting to maintain relatively stable conditions by minimizing cross-flow, e.g. substantially uniform distribution and axial direction of the core output flow throughout the inner barrel assembly, there remains the critical problem of properly supporting the rod guides within the inner barrel, because of remaining excitation forces from internals vibration and axial flow turbulence.

The present invention addresses the problem of the top end support for rod guides which house so-called water displacement rods or rodlets, also referred to as water displacer rodlet clusters (WDRC), which terms are used synomonously herein. Basically, the WDRC rod guide top end support of the invention provides for a telescoping interconnection between the lower calandria plate and the top end of each WDRC rod guide. Each of the rod guide top end supports of the invention maximizes the area of the wear surface of the telescoping interconnection with the associated rod guide, thereby to resist wear during normal operation, while permitting access to the rod cluster received in each such rod guide to facilitate the performance of routine maintenance functions. Additionally, the top end support of the present invention accommodates the requisite flow path to the calandria for the core output flow during operation of the reactor.

More specifically, the top end support for the WDRC rod guides comprises a fixed cylindrical support having a closed end with a central aperture which is received over a depending calandria extension on the lower surface of the lower calandria plate and is bolted thereto, the support having a cylindrical sidewall extending downwardly from the lower calandria plate, the outer circumferential surface of which comprising a wear surface of substantial area. An axially extending sleeve having an outer periphery corresponding in cross-section to that of the rod guide is affixed at its lower end to the rod guide and has an inner circumferential surface of generally cylindrical cross-section for receiving the integral sidewall of the fixed cylindrical support in telescoping relationship therewith, the sleeve having an axial length such that the upper end thereof is disposed closely adjacent to but displaced from the lower surface of the lower calandria plate when in assembled relationship with the cylindrical support. Each of the fixed cylindrical supports, including the end closure thereof and the depending cylindrical sidewall, and the interior portion of the sleeve include mating recesses therein corresponding to flow holes typically symetrically disposed about the depending extension of a given top end support to afford unimpeded passage therethrough of the core outlet flow. As a concomitant advantage of affording maximum area of the wear surface through maximizing the interior diameter of the sleeve, adequate space thereby is afforded for axially withdrawing a rod cluster from within the rod guide and associated sleeve, such as is required for maintenance purposes. Preferably, a lower axial portion of the interior diameter of the cylindrical sidewall furthermore is machined to define receiving channels for clearance in axially raising the rod cluster for accommodating the upper end thereof, as is required during control of the reactor through adjustment of the height of the rod cluster, thereby permitting use of a reactor vessel of shorter axial height, where axial height limitations are of concern.

The RCC rod guides may be connected to the calandria by any desired support structure, such as that shown in the concurrently filed application entitled FLEXIBLE ROD GUIDE SUPPORT STRUCTURE FOR INNER BARREL ASSEMBLY OF PRESSURIZED WATER REACTOR Gillett et al., Ser. No. 798,220, filed Nov. 14, 1985, and which is assigned to the common assignee hereof.

The top end support of the present invention thus provides overall support and alignment between the calandria and the associated rod guides, loads exerted on the associated rod guides being reacted into the calandria. The telescoping interconnection between the fixed cylindrical supports and the associated rod guide sleeves, on the other hand, provides compensation for thermal stresses and accommodates tolerances in the axial spacing between the lower calandria plate and the upper core plate and the vibrations encountered during operation, while facilitating removal and reassembly of the calandria with the rod guides for routine maintenance. Moreover, the configuration of the top end support maximizes the area of the associated wear surfaces, affording a long-life device. Significantly, the top end support is configured to provide the requisite flow paths through the lower calandria plate for the core outlet flow.

These and other advantages of the top end support for rod guides in accordance with the present invention will become more apparent from the following detailed description and drawing.

DETAILED DESCRIPTION OF THE PREFERRED EMBODIMENTS

Figure 1:
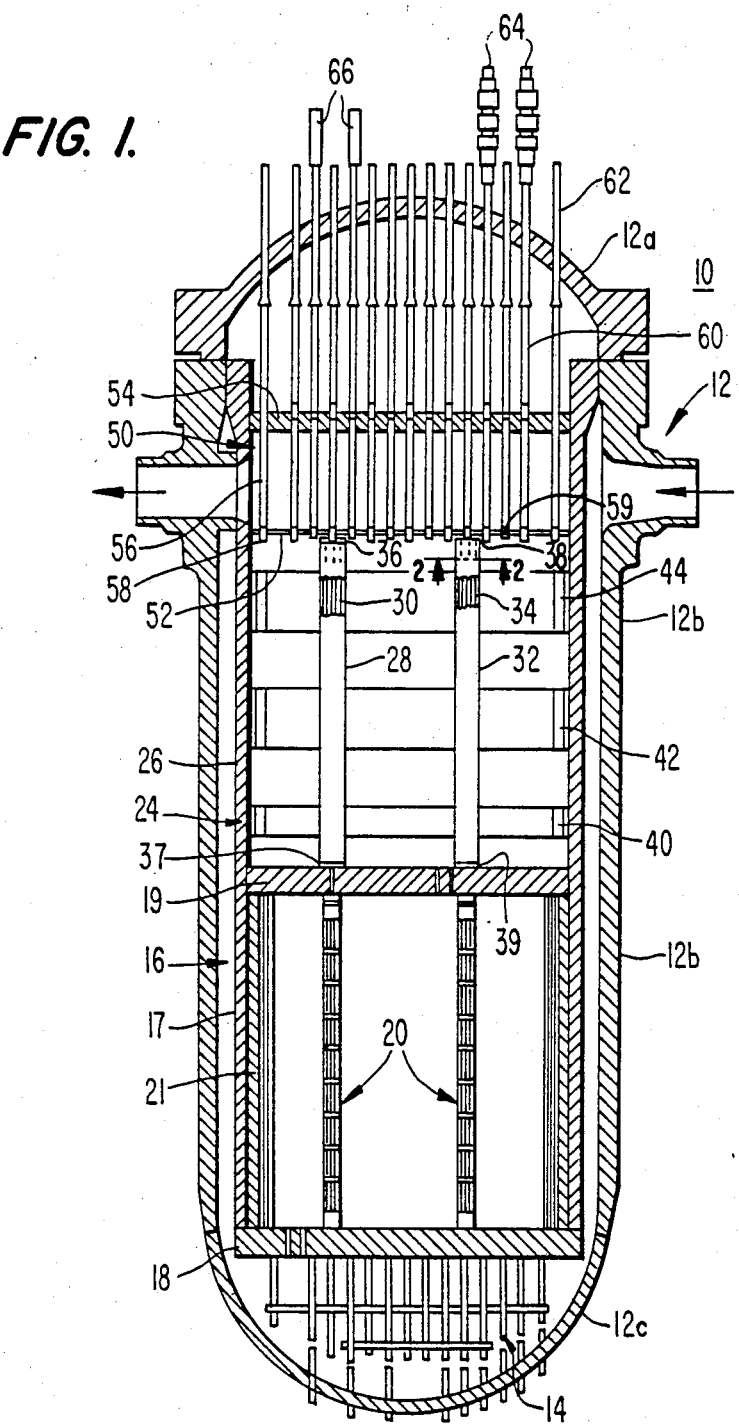
FIG. 1 is an elevational view, partially in cross-section, of a pressurized water reactor of the type with which the top end supports of the present invention are intended to be employed.

FIG. 1 is an elevational view, partly in cross-section, of a pressurized water reactor 10 comprising a vessel 12 of generally conventional configuration including an upper dome 12a, cylindrical sidewalls 12b, and a bottom closure 12c comprising the base of the reactor 10. Within the bottom closure 12c, as schematically indicated, is so-called base-mounted instrumentation 14. The lower barrel assembly 16 comprises a generally cylindrical sidewall 17 affixed at its lower and upper ends to respective lower and upper core plates 18 and 19. Fuel rod assemblies 20 are positioned in generally vertically oriented, parallel axial relationship within the lower barrel assembly 16. A radiation reflection shield 21 is mounted interiorly of the cylindrical sidewalls 17, in conventional fashion.

The inner barrel assembly 24 includes a cylindrical sidewall 26 within which are positioned a plurality of rod guides in closely spaced, parallel axial relationship; for simplicity of illustration, only two such rod guides are shown in FIG. 1, namely rod guide 28 housing a cluster of radiation control rods 30 (RCC) and a rod guie 32 housing a cluster of water displacement rods 34 (WDRC). Mounting means 36 and 37 are provided at the respective upper and lower ends of the rod guide 28 and, correspondingly, mounting means 38 and 39 are provided at the respective upper and lower ends of the rod guide 32, the lower end mounting means 37 and 39 mounting the respective rod guides 28 and 32 to the upper core plate 19, and the upper mounting means 36 and 38 mounting the respective rod guides 28 and 32 to a calandria assembly 50, and more particularly, to the lower caladria plate 52. The inner barrel assembly 24 thus is defined to extend, in axial height, from a first plate of lower elevation comprising the upper core plate 19 to a second plate of higher elevation comprising the lower calandria plate 52.

The calandria assembly 50 includes a lower calandria plate 52, an upper calandria plate 54, and a plurality of parallel axial calandria tubes 56 which are positioned in alignment with corresponding apertures in the lower and upper calandria plates 52 and 54 and to which the calandria tubes 56 are mounted at their respective, opposite ends. Extending upwardly beyond the upper calandria plate 54 and, more particularly, within the dome 12a of the vessel 12, there is provided a plurality of flow shrouds 60 respectively aligned with the calandria tubes 56. A corresponding plurality of head extensions 62 is aligned with the plurality of flow shrouds 60, with respective adjacent ends thereof in generally overlapping relationship. Control rod cluster (RCC) displacement mechanisms 64 and water displacement rod cluster (WDRC) displacement mechanisms 66 are associated with the respective head extensions 62, flow shrouds 60 and calandria tubes 56 which, in turn, are respectively associated with the respective clusters of radiation control rods 30 and water displacment rods 34. Particularly, the RCC and WDRC displacement mechanisms 64 and 66 connect through corresponding lines to the respective clusters of radiation control rods and water displacement rods 30 and 34, to control the respective vertical positions thereof and, particularly, to selectively lower same through corresponding openings (not shown) provided therefore in the upper core plate 19 into surrounding relationship with respectively associated fuel rod assemblies 20. While the particular control function is not relevant to the present invention, insofar as the control over the reaction within the core is effected by the selective positions of the respective rod clusters 30 and 34, it is believed that those skilled in the art will appreciate that moderation or control of the reaction is accomplished in accordance with the extent to which the control rod clusters 30 are inserted into the core and with the effective water displacement adjustment which is achieved by selective positioning of the water displacement rods 34.

A first matrix of calandria extensions 58 project downwardly from the calandria tubes 56 and connect to corresponding mounting means 36 for the upper ends, or tops, of the RCC rod guides 28. As before noted, the top end support for the RCC rod guides 28 may be in accordance with the structure disclosed in a concurrently filed application of one of the named co-inventors herein, entitled FLEXIBLE ROD GUIDE SUPPORT STRUCTURE FOR INNER BARREL ASSEMBLY OF PRESSURIZED WATER REACTOR, Gillett et al., Ser. No. 798,220, filed Nov. 14, 1985, assigned to the common assignee herewith.

A second matrix of calandria extensions 59, in interleaved relationship with the matrix of extensions 58, projects downwardly from the respectively corresponding calandria tubes 56, each extension 59 connecting to a corresponding mounting means 38 for a WDRC rod guide 32, in accordance with the present invention. As before briefly noted, each of the mounting means 38 for the WDRC rod guides provides a telescoping interconnection between the lower calandria plate 52 and the respectively associated WDRC rod guide 32, thereby affording axial alignment and lateral support of the associated, individual WDRC rod guide 32. The calandria extensions 59 function to react seismic forces from the rod guides 32 into the calandria, while accommodating axial height tolerances and thermal stresses at the interface of the upper ends of the rod guides 32 and the lower calandria plate 52.

Figure 2:
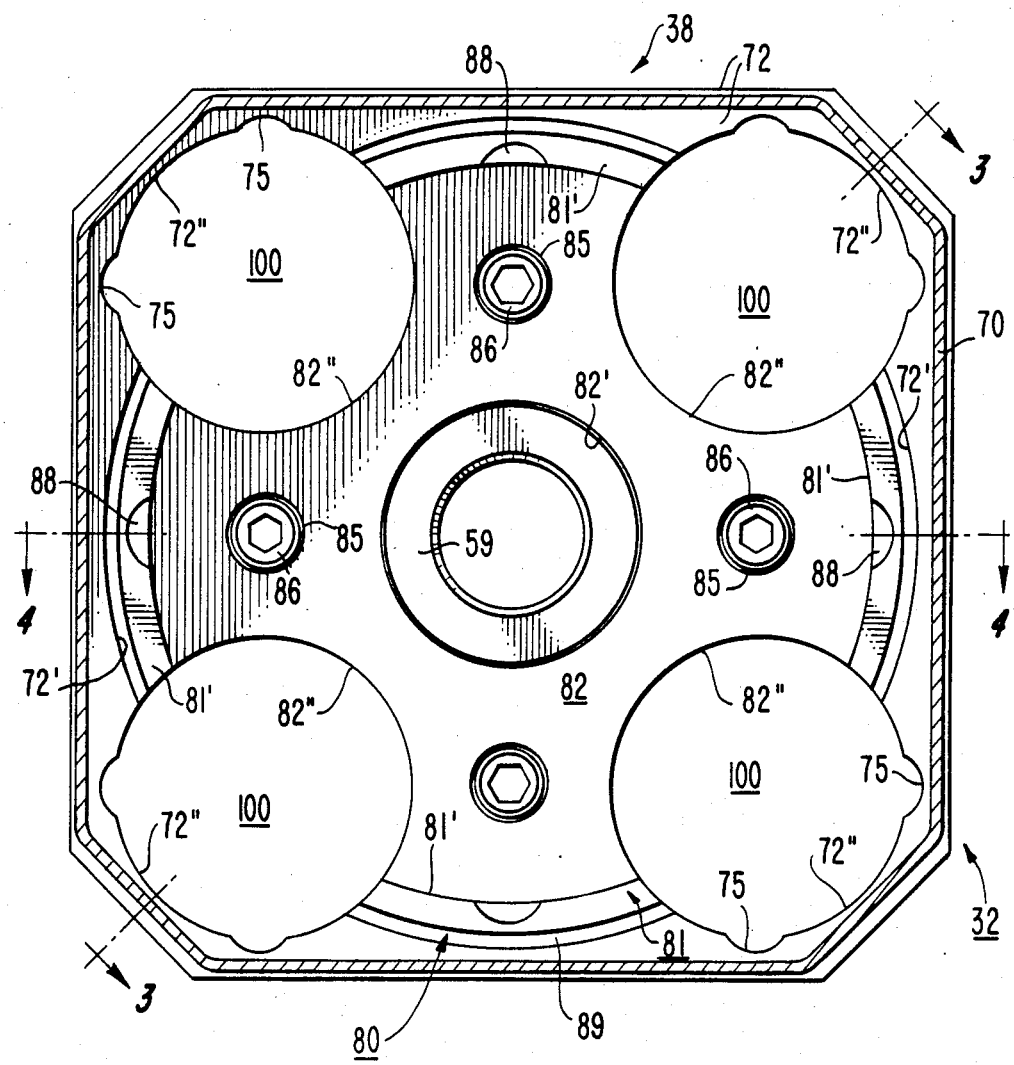
FIG. 2 is a plan view of a top end support in accordance with the present invention, taken along the line 2—2 in FIG. 1, and thus showing in cross-section the sidewalls of the WDRC rod guide associated with the illustrated top end support.

FIG. 2 is a plan view of the top end support in accordance with the present invention, taken along the line 2—2 in FIG. 1 and thus showing an upper end portion o a WDRC rod guide 32 in cross-section, and a bottom plan view of the associated top end support 38. The top end support 38 furthermore will be described with concurrent reference to FIGS. 3 and 4, which respectively comprise cross-sectional elevational views taken along the lines 3—3 and 4—4 in FIG. 2.

The WDRC rod guide, throughout substantially its entire axial length, comprises a relatively thin metal sidewall 70 of generally square cross-sectional configuration which carries, at its upper extremity, a reinforced, generally coaxial sleeve 72 having a generally square cross-sectional configuration corresponding to the outer perimeter of the thin sidewall 70 and which is permanently joined at its bottom end to the top end of the latter at their common outer perimeters, as illustrated by weld bead 74. The sleeve 72 is one component of a pair of wear couple components which axially align and laterally support the rod guide with respect to the lower calandria plate 52.

The second component of the top end support 38 comprises a fixed cylindrical support 80 having a generally cylindrical sidewall 81 and an end closure 82. The end closure 82 includes a central aperture 82' for receiving therethrough the calandria extension 59 in closely engaged, coaxial relationship.

Flow holes 100 are disposed in a symmetrical array about the axis of the calandria extension 59 associated with the WDRC rod guide 32 and its associated top end support 38, which must be unobstructed so as to permit unimpeded passage of the core output flow axially therethrough and into the calandria assembly 50. Accordingly, the cylindrical sidewall 81 is discontinuous, or terminates, at the corresponding perimeters of the flow holes 100 and thus comprises a plurality of arcuate segments 81' (best seen in FIG. 2), each bounded at its opposite ends by the corresponding perimeters of the adjacent flow holes 100. The end closure 82 correspondingly is configured to accommodate the flow holes 100 and thus includes a number of arcuate indentations, or recesses, 82" corresponding to the inner perimeter portions of the flow holes 100 adjacent the calandria extension 59.

Figure 4:
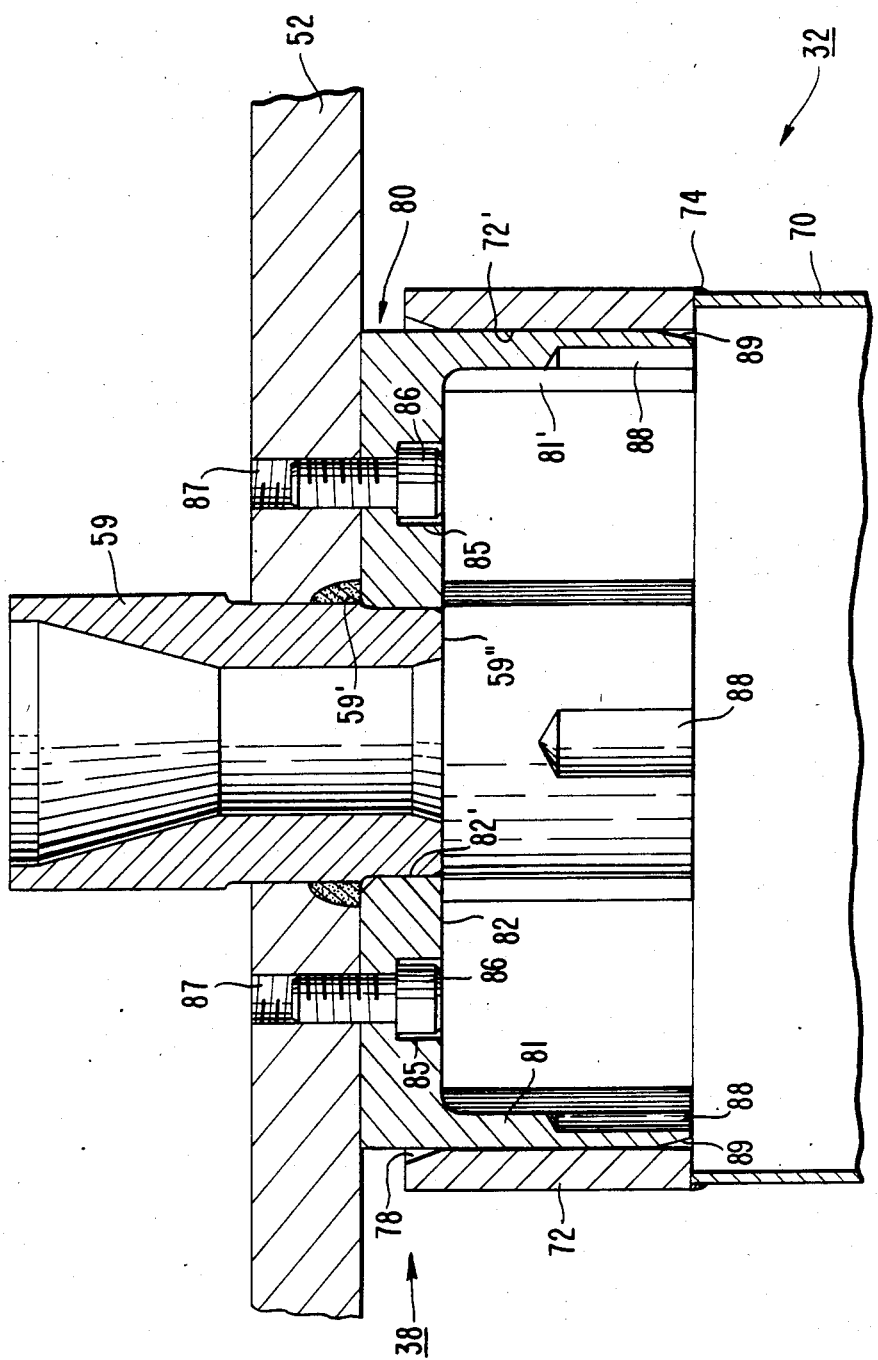
FIG. 4 is a cross-sectional, elevational view taken along the line 4—4 in FIG. 2.

As best seen in FIG. 4, the calandria extension 59 is rigidly secured to the lower calandria plate 52 by a weld bead 59' which extends about the entire circumference of the extension 59, the calandria extension 59 being of sufficient axial length such that its lower end 59" is flush with the lower surface of the end closure 82. The end closure 82 furthermore includes a number of countersunk bores 85 through which bolts 86 are received and secured in tightly threaded engagement with the corresponding threaded bores 87 in the calandria lower plate 52. The interior surfaces of the arcuate segments 81' include axially extending grooves 88, for a purpose to be explained.

The rod guide sleeve 72 is machined so as to include an inner surface having a configuration which accommodates the flow holes 100, and defines a mating, wear surface with the outer circumferences of the arcuate segments 81' of the cylindrical sidewall 81. More specifically, as best seen in FIG. 2, the rod guide sleeve 72 includes plural interior arcuate surfaces 72' in precise conformity and mating relationship with the corresponding exterior surfaces of the arcuate segments 81' of the cylindrical sidewall 81, and generally arcuate recesses 72" conforming to the corresponding outer perimeter portions of the flow holes 100. Within each of the arcuate recesses 72" there additionally are formed axially extending grooves 75, for a purpose to be explained.

Figure 3:
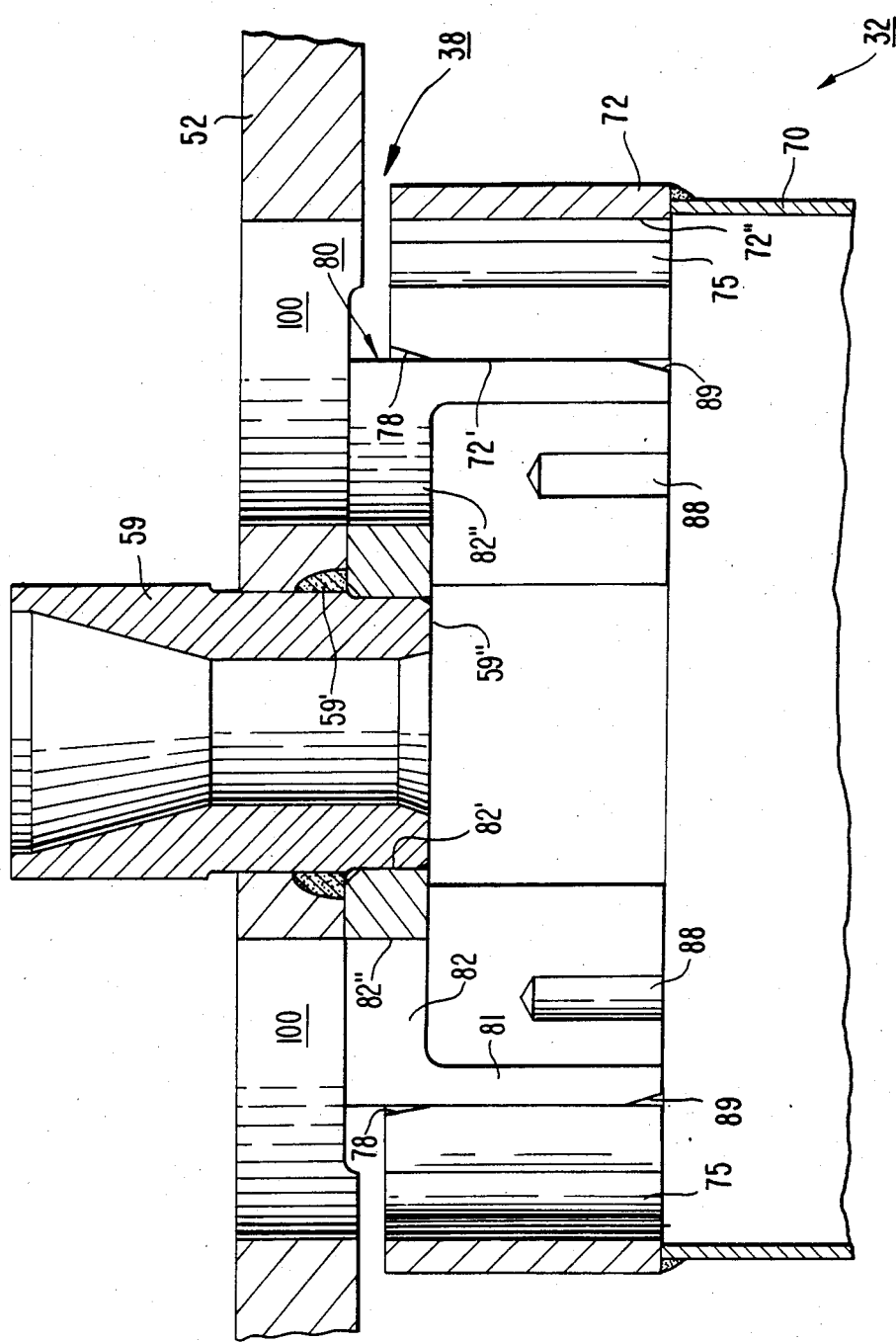
FIG. 3 is a cross-sectional, elevational, elevational view taken along the line 3—3 in FIG. 2.

As best seen in FIGS. 3 and 4, the fixed cylindrical support 80 and the rod guide sleeve 72 are assembled in coaxial, concentric and telescoping relationship, permitting axial movement therebetween while restraining any lateral movement such that forces acting on the rod guide 32 are reacted through the top end support 38 and into the lower calandria plate 52. To facilitate the telescoping assemblage, the sleeve 72 includes an outward bevel 78, and the cylindrical support 80 includes an inward bevel 89.

Figure 5:
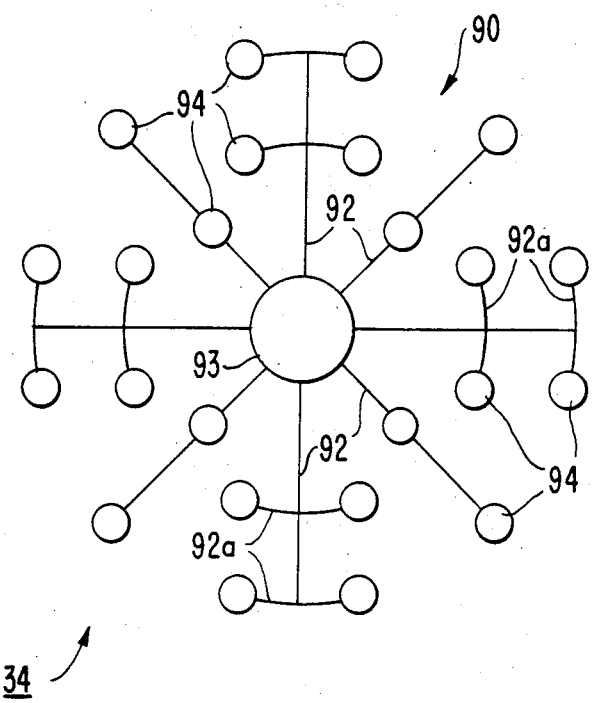
FIG. 5 is a schematic, plan view illustrating a WDRC rod cluster in a configuration for being received within the rod guide and associated top and support in accordance with the present invention as illustrated in the foregoing figures.

FIG. 5 comprises a simplified, schematic plan view of the WDRC rod cluster 34, more particularly comprising a spider 90 having a plurality of radially extending arms 92 connected to a central hub 93; further, alternate ones of the arms 92 include transverse cross-arms 92a. A plurality of WDRC rods 94 are appropriately connected to the arms 92 and the cross-arms 92a and depend therefrom in parallel axial relationship.

With concurrent reference to FIGS. 2 to 5, the grooves 75 and 88 are designed to accommodate the outer pair of rods 94 on the outermost cross-bars 92, and the rods 94 at the extremities of the single radial arms 92, respectively, so that a given cluster 34 may be raised to the extent necessary within the inner barrel assembly and particularly within its associated rod guide 32 for the aforementioned control purposes. The provision of the grooves 75 and 88 more particularly avoids the necessity of increasing the height of the inner barrel assembly 24 in the event that adequate axial height is not available for permitting the cluster 34 to be raised to the required height. Where adequate vertical space is available, the groove 75 and 88 are not required, and accordingly are optional.

In accordance with the foregoing, it will be understood that secure mounting of the top ends of the WDRC rod guides is afforded, while permitting the required vertical displacement of the associated WDRC rod clusters. Further, the telescoping interconnections of the sleeves 72 and the corresponding fixed cylindrical supports 80 permit the calandria 50 to be raised and withdrawn, affording access to the rod clusters 34 within the respective guides 32 for normal maintenance purposes.

In an actual pressurized water reactor of the advanced design herein contemplated and incorporating the present invention, the thin wall section 70 of the rod guide 32 is formed of sheet metal of approximately ⅛ inch thickness. The rod guide 32 is approximately 12 inches wide, in both dimensions of its generally square cross-section, and approximately 174" (14½ feet) in height. The rod guide sleeve 72 has an outer periphery, in cross-section, corresponding to that of the rod guide 70, as aforenoted, and defines an inner circumferential support/wear surface of approximately 11.20 inches in diameter. The fixed cylindrical support 80 has a corresponding outer diameter of approximately 11.14 inches thereby to afford a nominal 0.030 inch radial clearance to permit the telescoping interconnection of the wear surfaces of the cylindrical support 80 and the sleeve 72. The end closure 82 of the cylindrical support 80 has a thickness as measured in the vertical axial direction of approximately 1.10 inches. The axial height of the sleeve 72 is approximately 4.0 inches whereas the axial length of the cylindrical support 80 is approximately 4.60 inches in axial height, resulting in a clearance between the upper end of the sleeve 72 and the lower surface of the lower calandria plate 52 of approximately 0.60 inches. The bevels 80 and 89 are each of approximately 0.625 inches, resulting in an axial length of the engaged, wear surfaces of the inner circumference of the sleeve 72 and the outer circumference of the cylindrical support 80 of approximately 2.75 inches. The substantial wear surface area thus afforded provides for long life of the top end support of the present invention, as before noted.

Further enhancement of the effective life of the top end support of the invention may be achieved by appropriate selection of the materials used in fabricating the cylindrical support 80 and the sleeve 72, on at least the engaged, wear surfaces thereof. Various weld overlay materials are suitable for this purpose. An electro-spark deposited coating having particularly desirable characteristics for this purpose, in view of the reduced amount of cobalt contained therein, is disclosed in an application entitled WEAR RESISTANT ZIRCONIUM BASE ALLOY ARTICLE FOR WATER REACTORS, Ser. No. 798,193, filed Nov. 14, 1985 assigned to the common assignee herewith.

Numerous modifications and adaptations of the present invention will be apparent to those of skill in the art and thus it is intended by the appended claims to cover all such modifications and adapations as fall within the true spirit and scope of the invention.

We claim as our invention:

1. A top end support for rod guides disposed in closely spaced, parallel axial relationship in an inner barrel assembly of a pressurized water reactor vessel, the inner barrel assembly occupying a central portion of the vessel and being of a vertical height extending from a first plate of lower elevation to a second plate of higher elevation within the vessel, each of said rod guides having a thin sidewall portion of elongated configuration and of an axial length corresponding substantially to the vertical height of said inner barrel assembly and having a generally square cross-section, each rod guide accommodating in axial, sliding relationship therewithin a respectively associated cluster of elongated rods interconnected to extend in parallel axial relationship, comprising, for each said rod guide:

an axially extending sleeve affixed at a lower end thereof to the upper end of a respective said thin sidewall of said rod guide and of an axial length such that said upper end thereof is closely adjacent to but displaced from the lower surface of the second plate when in assembled relationship therewith, said sleeve having an outer surface generally corresponding in cross-section to that of said thin wall portion of said rod guide and an inner circumferential surface of generally cylindrical cross-section;

a fixed cylindrical support having an upper end closure having an upper surface adapted for being positioned in abutting surface contact with the lower surface of the second plate and secured thereto, and having an integral depending sidewall having an exterior surface of generally cylindrical configuration received in telescoping relationship within said circumferential surface of said rod guide sleeve when in assembled relationship therewith and said respective exterior and inner circumferential surfaces of said fixed cylindrical support and said rod guide sleeve defining a wear-couple permitting relative axial movement of said sleeve relative to said fixed cylindrical support while restraining relative lateral movement therebetween;

a cylindrical extension, extending through a corresponding aperture in the second plate and rigidly secured thereto and defining an alignment axis of an associated fixed cylindrical support, and an array of flow holes in the second plate disposed radially at displaced positions about an associated depending extension;

said upper end closure of said fixed cylindrical support further comprising a central aperture for receiving therein an associated, said depending extension in telescoping relationship therewithin for axially aligning said fixed cylindrical support and a plurality of flow holes therein corresponding to said array of flow holes of the second plate; and means for rigidly and releasably securing said upper end closure of said fixed cylindrical support to the second plate.

2. A top end support as rectied in claim 1, wherein:

said upper end of said sleeve on said interior circumferential surface thereof includes a radially outward bevel; and said lower end of said cylindrical sidewall of said fixed cylindrical support on said outer circumferential surface thereof includes a radially inward bevel;

said radially outward and radially inward bevels facilitating the assemblage of said fixed cylindrical support and said sleeve in telescoping relationship.

3. A top end support as recited in claim 1, wherein the second plate includes an array of flow holes for passage therethrough of the core output flow within the vessel, and wherein there is further provided:

an array of depending extensions affixed to and extending through said second plate in parallel axial relationship, each said depending extension being disposed centrally of a predetermined number of respectively associated said flow holes with the latter at a common radial distance therefrom;

each said fixed cylindrical support being respectively associated with a corresponding said depending extension, said end closure of each thereof including a central aperture extending axially therethrough for receiving the respectively correspondinq said depending extension therein;

each said rod guide and associated sleeve being of sufficient cross-sectional dimension so as to encompass therewithin, throughout the height of the inner barrel assembly, the spatial area of the associated flow holes;

each said sleeve including a recess therein corresponding to an outer portion of the periphery of each said flow hole; and said cylindrical sidewall of each said fixed cylindrical support being discontinuous at the corresponding peripheries of each of said flow holes so as to comprise a plurality of arcuate segments extending intermediate successive said respectively associated flow holes, and said end closure of said cylindrical support including an arcuate recess aligned with and corresponding to the remaining peripheral portion of each of said respectively associated flow holes.

4. A top end support as recited in claim 1, further comprising:

an array of depending extensions respectively corresponding to said plurality of rod guides, each said extension being rigidly secured to the second plate and extending axially downwardly therefrom; and each said end closure including a central aperture extending axially therethrough for receiving a respectively corresponding said downward extension therein thereby to establish a predetermined position of each corresponding, said fixed cylindrical support relative to the second plate and thus within said inner barrel assembly and, correspondingly, a predetermined, aligned position of the associated rod guide when said sleeve thereof is assembled in telescoping relationship with said respectively corresponding fixed cylindrical support.

5. A top end support as recited in claim 4, wherein each said securing means comprises:

a plurality of bores disposed symmetrically about said central aperture and extending in parallel axial relationship through said end closure in alignment with respectively corresponding, threaded bores in the second plate; and bolts received through said bores in said end closure and engaging the respective, aligned threaded bores in the second plate for securing said cylindrical support thereto.

6. A nuclear reactor system comprising:

a pressure vessel;

an inner barrel assembly disposed in a central portion of said vessel and being of a vertical height extending from a first plate of lower elevation to a second plate of higher elevation within said vessel;

a plurality of rod guides disposed in closely spaced, parallel axial relationship in said inner barrel assembly, each of said rod guides having a thin sidewall portion of a generally square cross-section and an elongated configuration of axial length correponding substantially to the vertical height of said inner barrel assembly, each said rod guide accommodating an axial, sliding relationship therewithin a respectively associated cluster of elongated rods interconnected to extend in parallel axial relationship;

a plurality of axially extending sleeves respectively associated with said rod guides, each said axially extending sleeve being affixed at a lower end thereof to the upper end of said thin sidewall of the respective said rod guide and of an axial length such that said upper end thereof is closely adjacent to but displaced from the lower surface of the second plate when in assembled relationship therewith, said sleeve having an outer surface generally corresponding in cross-section to that of said thin wall portion of said rod guide and an inner circumferential surface of generally cylindrical cross-section;

a fixed cylindrical support having an upper end closure having an upper surface adapted for being positioned in abutting surface contact with the lower surface of the second plate and secured thereto, and having an integral depending sidewall having an exterior surface of generally cylindrical configuration received in telescoping relationship within said circumferential surface of said rod guide sleeve when in assembled relationship therewith and said respective exterior and inner circumferential surfaces of said fixed cylindrical support and said rod guide sleeve defining a wear-couple permitting relative axial movement of said sleeve relative to said fixed cylindrical support while restraining relative lateral movement therebetween;

a cylindrical extension, extending through a corresponding aperture in the second plate and rigidly secured thereto and defining an alignment axis of an associated fixed cylindrical support, and an array of flow holes in the second plate disposed radially at displaced positions about an associated depending extension;

said upper end closure of said fixed cylindrical support further comprising a central aperture for receiving therein an associated, said depending extension in telescoping relationship therewithin for axially aligning said fixed cylindrical support and a plurality of flow holes therein corresponding to said array of flow holes of the second plate; and means for rigidly and releasably securing said upper end closure of said fixed cylindrical support to the second plate.

7. A nuclear reactor system as rectied in claim 6, wherein:

said upper end of said sleeve on said interior circumferential surface thereof includes a radially outward bevel; and said lower end of said cylindrical sidewall of said fixed cylindrical support on said outer circumferential surface thereof includes a radially inward bevel;

said radially outward and radially inward bevels facilitating the assemblage of said fixed cylindrical support and said sleeve in telescoping relationship, 8. A nuclear reactor system as recited in claim 6, wherein the second plate includes an array of flow holes for passage therethrough of the core output flow within the vessel, and wherein there is further provided:

an array of depending extensions affixed to and extending through said second plate in parallel axial relationship, each said depending extension being disposed centrally of a predetermined number of respectively associated said flow holes with the latter at a common radial distance therefrom;

each said fixed cylindrical support being respectively associated with a corresponding said depending extension, said end closure of each thereof including a central aperture extending axially therethrough for receiving the respectively corresponding said depending extension therein;

each said rod guide and associated sleeve being of sufficient cross-sectional dimension so as to encompass therewithin, throughout the height of the inner barrel assembly, the spatial area of the associated flow holes;

each said sleeve including a recess therein corresponding to an outer portion of the periphery of each said flow hole; and said cylindrical sidewall of each said fixed cylindrical support being discontinuous at the corresponding peripheries of each of said flow holes so as to comprise a plurality of arcuate segments extending intermediate successive said respectively associated flow holes, and said end closure of said cylindrical support including an arcuate recess aligned with and corresponding to the remaining peripheral portion of each of said respectively associated flow holes.

9. A nuclear reactor system as recited in claim 6, further comprising:

an array of depending extensions respectively corresponding to said plurality of rod guides, each said extension being rigidly secured to the second plate and extending axially downwardly therefrom; and each said end closure including a central aperture extending axially therethrough for receiving a respectively corresponding said downward extension therein thereby to establish a predetermined position of each corresponding, said fixed cylindrical support relative to the second plate and thus within said inner barrel assembly and, correspondingly, a predetermined, aligned position of the associated rod guide when said sleeve thereof is assembled in telescoping relationship with said respectively corresponding fixed cylindrical support.

10. A nuclear reactor system as recited in claim 9, wherein each said securing means comprises:

a plurality of bores disposed symmetrically about said central aperture and extending in parallel axial relationship through said end closure in alignment with respectively corresponding, threaded bores in the second plate; and bolts received through said bores in said end closure and engaging the respective, aligned threaded bores in the second plate for securing said cylindrical support thereto.

* * * * *